(12) United States Patent
Schuler et al.

(10) Patent No.: US 7,924,158 B2
(45) Date of Patent: Apr. 12, 2011

(54) DYNAMIC UPDATING OF PRODUCT PROFILES FOR ACTIVE LIFESTYLES

(75) Inventors: Francesca Schuler, Des Plaines, IL (US); Krishna D. Jonnalagadda, Algonquin, IL (US); Janice M. Danvir, Arlington Heights, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 0 days.

(21) Appl. No.: 11/926,993

(22) Filed: Oct. 29, 2007

(65) Prior Publication Data

US 2008/0157971 A1   Jul. 3, 2008

Related U.S. Application Data

(63) Continuation-in-part of application No. 11/616,645, filed on Dec. 27, 2006, now abandoned.

(51) Int. Cl.
*G08B 13/14* (2006.01)
(52) U.S. Cl. ............... 340/572.1; 340/573.1; 340/568.1; 340/5.61; 340/10.1; 705/16; 705/17; 705/18; 705/67; 235/375; 235/383; 235/385
(58) Field of Classification Search ............... 340/572.1, 340/573.1, 568.1, 5.61, 10.1; 705/18, 1, 705/14, 67, 962; 455/73, 403; 700/236; 707/102; 902/22; 235/375, 383, 385, 462.45; 128/921
See application file for complete search history.

(56) References Cited

U.S. PATENT DOCUMENTS

| | | | |
|---|---|---|---|
| 5,979,757 A * | 11/1999 | Tracy et al. | 235/383 |
| 6,108,685 A | 8/2000 | Kutzik et al. | |
| 6,375,077 B1 * | 4/2002 | Hankins | 235/462.45 |
| 6,424,264 B1 | 7/2002 | Giraldin et al. | |
| 6,602,191 B2 | 8/2003 | Quy | |
| 6,605,038 B1 | 8/2003 | Teller et al. | |
| 6,774,811 B2 | 8/2004 | Kaufman et al. | |
| 7,140,542 B2 | 11/2006 | Andreasson et al. | |
| 7,295,116 B2 | 11/2007 | Kumar et al. | |
| 2002/0019586 A1 | 2/2002 | Teller et al. | |

(Continued)

FOREIGN PATENT DOCUMENTS

EP    1 522 949 A1    4/2005

(Continued)

OTHER PUBLICATIONS

International Search Report dated Jun. 26, 2008 for PCT/US07/83064.

(Continued)

*Primary Examiner* — George A Bugg
*Assistant Examiner* — Sisay Yacob

(57) ABSTRACT

A method and wireless communication device are provided for managing information associated with purchases of active lifestyle products. The method includes receiving a notification (704) indicating a purchase transaction associated with at least one radio frequency ID enabled item. The notification is analyzed (706) and in response to the analyzing a user identifier corresponding to a user related to the purchase transaction is determined (708). A radio frequency ID associated with the at least one radio frequency ID enabled item is also determined (710). A wireless device (104) associated with the user is identified based on the user identifier (712). An information set associated with the at least one radio frequency ID enabled item is transmitted (714) to the wireless device (104). The information set includes at least the radio frequency ID associated with the at least one radio frequency ID enabled item.

20 Claims, 7 Drawing Sheets

U.S. PATENT DOCUMENTS

| | | | |
|---|---|---|---|
| 2002/0079368 A1 | 6/2002 | Hankins | |
| 2002/0147629 A1* | 10/2002 | Alsafadi et al. | 705/10 |
| 2003/0028451 A1* | 2/2003 | Ananian | 705/27 |
| 2004/0073482 A1* | 4/2004 | Wiggins et al. | 705/14 |
| 2004/0185881 A1 | 9/2004 | Lee et al. | |
| 2004/0198555 A1 | 10/2004 | Anderson et al. | |
| 2005/0065971 A1 | 3/2005 | Honda | |
| 2005/0093698 A1 | 5/2005 | Sakamoto et al. | |
| 2005/0216126 A1 | 9/2005 | Koselka et al. | |
| 2005/0250458 A1* | 11/2005 | Graham et al. | 455/121 |
| 2005/0285739 A1 | 12/2005 | Velhal et al. | |
| 2006/0205359 A1 | 9/2006 | Brooks | |
| 2006/0205564 A1 | 9/2006 | Peterson | |
| 2006/0229504 A1 | 10/2006 | Johnson, Jr. | |
| 2007/0257768 A1* | 11/2007 | Bowers et al. | 340/5.61 |

FOREIGN PATENT DOCUMENTS

| | | |
|---|---|---|
| JP | 2004-258914 A | 9/2004 |
| JP | 2007-004615 A | 1/2007 |
| KR | 10-0706914 B1 | 4/2007 |

OTHER PUBLICATIONS

Bradbury, M., "Dumbing Down a Smartwatch," *Wired News*, Nov. 29, 2004, http://www.wired.com/news/technology/0,1282,65721,00.html.

Vigoda, et al., "TouchTags: Using Touch to Retrieve Information Stored in a Physical Object," MIT, 2 pages, http://www.media.mit.edu/physics/publications/papers/99.01touchtag.rtf.

Tagalert help you keep track of personal stuff, RFID Gasette (Journal), Mar. 20, 2006.

* cited by examiner

US 7,924,158 B2

DYNAMIC UPDATING OF PRODUCT PROFILES FOR ACTIVE LIFESTYLES

CROSS-REFERENCE TO RELATED APPLICATIONS

This application is a continuation-in-part of application entitled "Dynamic Updating of Product Profiles For Active Lifestyles," U.S. patent application Ser. No. 11/616,645, filed on Dec. 27, 2006 now abandoned. This application is also related to applications entitled "Monitoring For Radio Frequency Enabled Items Based On Activity Profiles," U.S. patent application Ser. No. 11/616,621, and "Active Lifestyle Management", U.S. patent application Ser. No. 11/616,636, all of which were filed on Dec. 27, 2006 and commonly assigned to Motorola, Inc. These applications are collectively incorporated herein by reference in their entirety.

FIELD OF THE INVENTION

The present invention generally relates to the field of wireless communication devices, and more particularly relates managing lifestyle activity items via the wireless communication device.

BACKGROUND OF THE INVENTION

Wireless communication devices have evolved greatly over the past years. For example, current wireless communication devices can browse the Internet and play audio files among other things. As technology develops users will demand more from their wireless devices. For example, users may want their wireless device to be a lifestyle management hub, where lifestyle activities such as work, meetings, running, and the like are monitored and managed. However, current wireless communication devices only offer a calendar feature for organizing time and dates.

If a user desires to track certain items such as running shows associated with an activity such as running, a user has to use a traditional RFID tracking system. Radio frequency identification ("RFID") is used to automatically identify and track RFID enabled items. However, current RFID systems are not context based and constantly monitor for items. This not efficient for a wireless communication device where battery life is a valued resource.

Furthermore, user may want the wireless communication device to monitor devices and/or sensors associated with a lifestyle activity. For example, a user may want to use a biometric monitor during a lifestyle activity. However, current wireless communication devices are not capable of managing and/or monitoring such devices based on an activity context. For example, with current wireless communication devices a user has to manually initialize a sensor and manually execute an application on the device. This fails to provide a seamless environment for the user. The lifestyle activity devices can be purchased by a user at a store or on-line via a wireless device or a personal computer. A user then has to manually enter the sensor/RFID information into the wireless device to associate the sensor/RFID enabled item with an activity. Currently, a system does not exist to automatically update a wireless device when a user purchases lifestyle activity components.

Therefore a need exists to overcome the problems with the prior art as discussed above.

SUMMARY OF THE INVENTION

Briefly, in accordance with the present invention, disclosed is a method and wireless communication device for managing information associated with purchases of active lifestyle products. The method includes receiving a notification indicating a purchase transaction associated with at least one radio frequency ID enabled item. The notification is analyzed and in response to the analyzing a user identifier corresponding to a user related to the purchase transaction is determined. A radio frequency ID associated with the at least one radio frequency ID enabled item is also determined. A wireless device associated with the user is identified based on the user identifier. An information set associated with the at least one radio frequency ID enabled item is transmitted to the wireless device. The information set includes at least the radio frequency ID associated with the at least one radio frequency ID enabled item.

In another embodiment a method on a wireless device for managing information associated with active lifestyle products is disclosed. The method includes receiving an information set associated with at least one radio frequency ID enabled item. The information set comprises at least a radio frequency ID associated with the at least one radio frequency ID enabled item. The information set is received from one of a merchant, a manufacturer of the at least one radio frequency ID enabled item, and the at least one radio frequency ID enabled item. A first database for storing at least information associated with radio frequency ID enabled items is updated to include at least the radio frequency ID associated with the at least one radio frequency ID enabled item.

In yet another embodiment, a wireless communication device is disclosed. The wireless communication device includes a memory and a processor that is communicatively coupled to the memory. The wireless communication device also includes a lifestyle activity management module that is communicatively coupled to the memory and processor. The lifestyle activity management module is for receiving an information set associated with at least one radio frequency ID enabled item. The information set comprises at least a radio frequency ID associated with the at least one radio frequency ID enabled item. The information set is received from one of a merchant, a manufacturer of the at least one radio frequency ID enabled item, and the at least one radio frequency ID enabled item. A first database for storing at least information associated with radio frequency ID enabled items is updated to include at least the radio frequency ID associated with the at least one radio frequency ID enabled item.

One of the advantages of the present invention is that a lifestyle activity management environment residing on a wireless can be dynamically updated when a user purchases lifestyle activity components. For example, a merchant store includes or a third party includes an updating module that either notifies a user's wireless device or wireless carrier of an active lifestyle component purchase. The notification also includes active lifestyle component that is used to update the lifestyle activity management environment on the wireless device. Therefore, the lifestyle activity management environment is dynamically updated and a user does not need to manually enter lifestyle activity component information.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term wireless device is intended to broadly cover many different types of devices that can wirelessly receive signals, and optionally can wirelessly transmit signals, and may also operate in a wireless communication system. For example, and not for any limitation, a wireless communication device can include any one or a combination of the following: a cellular telephone, a mobile phone, a smartphone, a two-way radio, a two-way pager, a wireless messaging device, a laptop/computer, automotive gateway, residential gateway, and the like.

Wireless Communication System

Figure 1:
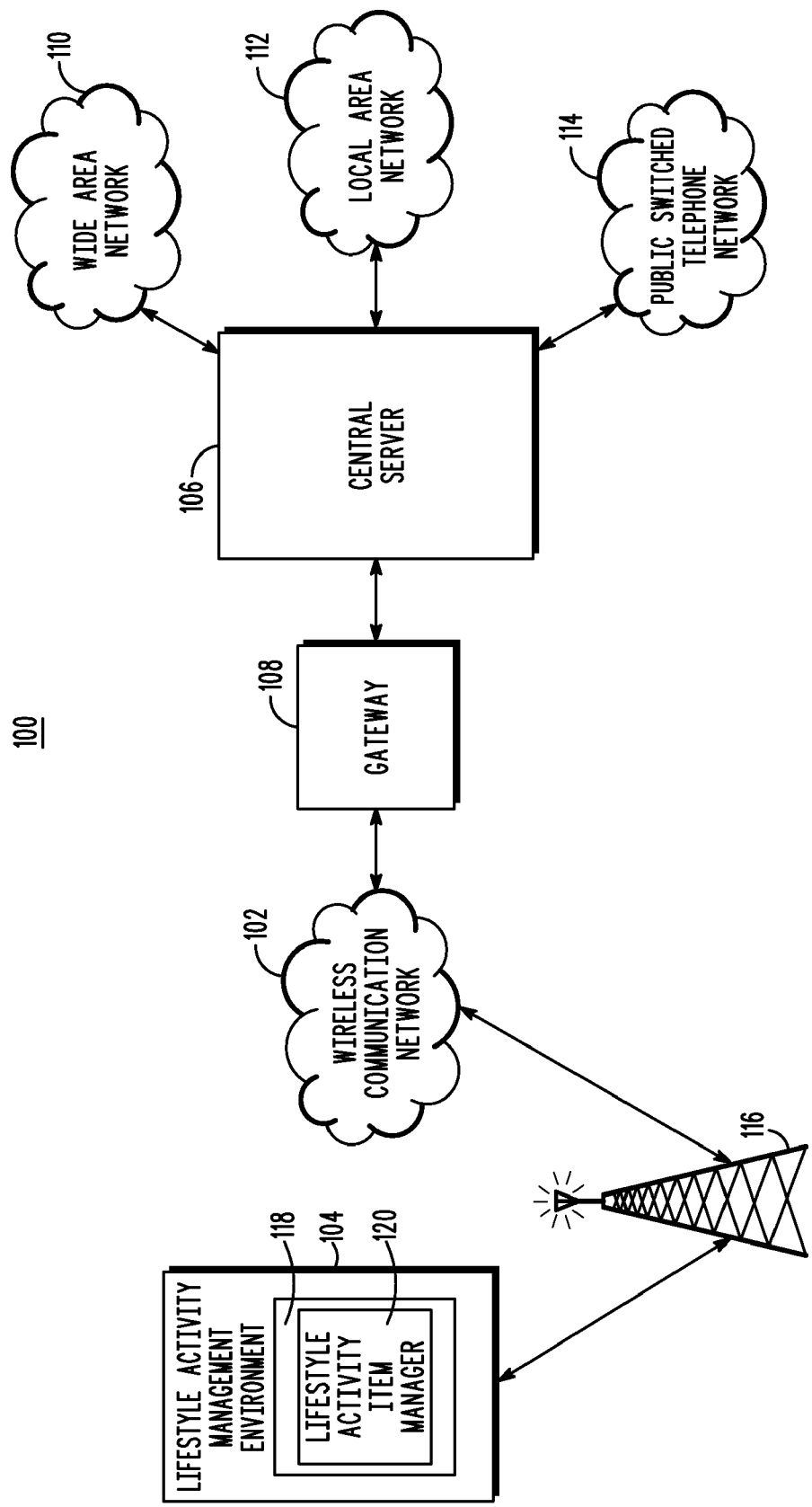
FIG. 1 is a block diagram illustrating wireless communications system according to an embodiment of the present invention.

FIG. 1 illustrates one example of a wireless communications system 100 according to an embodiment of the present invention. FIG. 1 shows a wireless communications network 102 that connects one or more wireless devices 104 with a central server 106 via a gateway 108. The wireless communications network 102 comprises a mobile phone network, a mobile text messaging device network, a pager network, or the like. Further, the communications standard of the wireless communications network 102 comprises Code Division Multiple Access ("CDMA"), Time Division Multiple Access ("TDMA"), Global System for Mobile Communications ("GSM"), General Packet Radio Service ("GPRS"), Frequency Division Multiple Access ("FDMA"), Orthogonal Frequency Division Multiplexing ("OFDM"), or the like. Additionally, the wireless communications network 102 also comprises text messaging standards, for example, Short Message Service ("SMS"), Enhanced Messaging Service ("EMS"), Multimedia Messaging Service ("MMS"), or the like.

The wireless communications network 102 supports any number of wireless communication devices 104. The support of the wireless communications network 102 includes support for mobile telephones, smart phones, text messaging devices, handheld computers, pagers, beepers, wireless communication cards, or the like. A smart phone is a combination of 1) a pocket PC, handheld PC, palm top PC, or Personal Digital Assistant (PDA), and 2) a mobile telephone. More generally, a smartphone can be a mobile telephone that has additional application processing capabilities. In one embodiment, wireless communication cards (not shown) reside within an information processing system (not shown). The information processing system (not shown), in one embodiment, can be a personal computer, a personal, digital assistant, a smart phone, and the like.

Additionally, the wireless device 104 can also include a local wireless link (not shown) that allows the wireless devices 104 to directly communicate with another wireless device without using the wireless network 102. The local wireless link (not shown), for example, is for allowing PTT communications. The local wireless link (not shown), in another embodiment, is provided by Bluetooth, Infrared Data Access (IrDA) technologies or the like. The central server 106 maintains and processes information for all wireless devices communicating on the wireless network 102.

Additionally, the central server 106, in this example, communicatively couples the wireless device 104 to a wide area network 110, a local area network 112, and a public switched telephone network 114 through the wireless communications network 102. Each of these networks 110, 112, 114 has the capability of sending data, for example, a multimedia text message to the wireless device 104 The wireless communications system 100 also includes one or more base stations 116.

The wireless device 104, in one embodiment, includes a lifestyle activity management environment 118, which in one embodiment, includes a lifestyle activity item manager 120. The lifestyle activity item manager 120 is discussed in greater detail below. A lifestyle activity for example can be a business activity, athletic activity, family activity, or any other activity. For example, the lifestyle activity management environment 118 can manage activities such as a business meeting, running, vacationing, or the like. The lifestyle activity management environment 118 can associate one or more contexts such as time, location, and the like to an activity. The lifestyle activity management environment 118 also manages any RFID enabled item associated with the activity. An RFID enabled item 120 is any item such as a gym bag, wallet, file, shoes, skis, and the like that is coupled to an RFID tag For example, an activity such as camping can have items associated with it such as a tent, cooler, lantern, sleeping bag, and the like. When the lifestyle activity management environment 118 detects that the activity is beginning or a monitoring event has begun it determines if each of these items are present and notifies a user accordingly. The monitoring of RFID enabled items associated with an activity is discussed in greater detail in the co-pending and commonly owned U.S. patent application Ser. No. 11/616,621, filed on Dec. 27, 2006, and entitled "Monitoring For Radio Frequency Enabled Items Based On Activity Profiles", which is hereby incorporated by reference in its entirety.

The lifestyle activity management environment 118 can also manage devices such as sensors that are associated with a lifestyle activity. For example, an activity such as running can have various sensors associated with it such as a biometric sensor, pedometer, accelerometer, and the like. These devices can be RFID enabled for communicating with the lifestyle activity management environment 118. The lifestyle activity management environment 118 maintains and manages these devices to ensure that they are present when a lifestyle activity begins. The lifestyle activity management environment 118 also ensures that the devices are initialized accordingly. The above process of managing devices such as sensors associated with a lifestyle activity is discussed further in the co-pending and commonly owned U.S. patent application Ser. No. 11/616,636, filed on Dec. 27, 2006, and entitled "Active Lifestyle Management", which is hereby incorporated by reference in its entirety.

Detailed View of the Wireless Communication System

Figure 2:
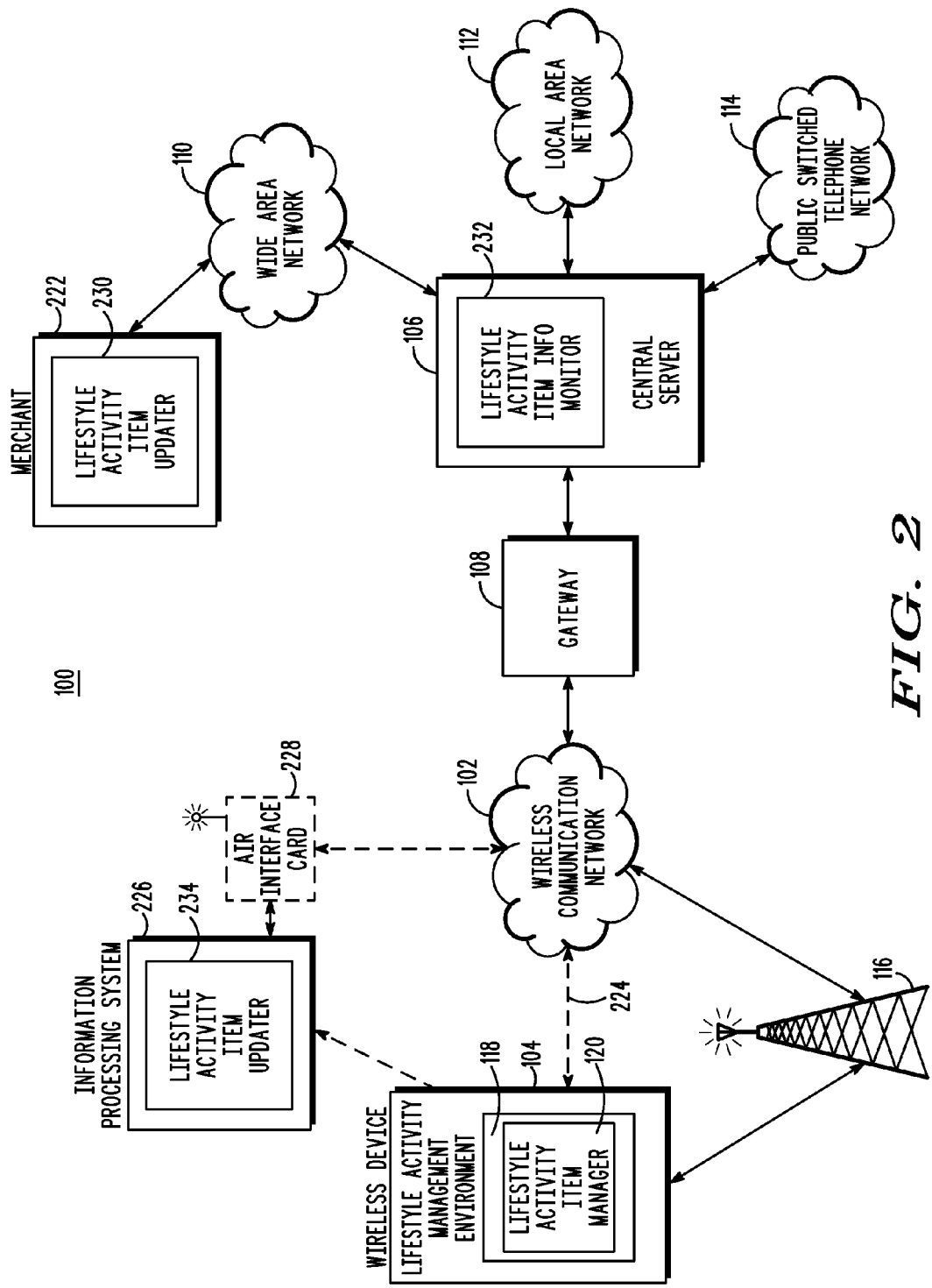
FIG. 2 shows a detailed view of the wireless communications system of FIG. 1 according to an embodiment of the present invention.

FIG. 2 is a block diagram showing a more detailed view of the wireless communication system 100 of FIG. 1. FIG. 2 shows one example of the wireless communication system 100 where the lifestyle management environment 118 is notified of newly purchased lifestyle activity components. For example, FIG. 2 shows a merchant 222 communicatively coupled to the wireless communications network 102 via a WAN 110 such as the Internet. A user can search the Merchant's website for lifestyle activity components via the wireless device. In one embodiment, the wireless communications network 102 includes a circuit services network and/or an IP network. As shown by the dashed line 224, the wireless device 104 can communication with the Merchant 222 via an IP network such as an 802.16 WiMax network. However, this is only one example and is not limiting.

Alternatively, a user can also communicate with the Merchant using an information processing system 226 such as a desktop or notebook computer. The information processing system 226, in one example, is communicatively coupled to the Merchant 222 directly via the WAN 110. In another embodiment, the information processing system 226 utilizes an air interface card 228 for communicating with the Merchant 222 via the wireless communications network 102. For example, the air interface card 228 can communicate over an 802.16 WiMax network provided by the wireless communications network 102. It should be noted that this is only one example and is not limiting.

In one example, the user purchases one or more lifestyle activity components that are RFID enabled. The lifestyle activity components can include one or more sensors, but are not required to. For example, a user can purchase a shirt, sun glasses, shoes, and the like. Items such as the shirt and sun glasses can include RFID tags and the shoes can include RFID tags and various sensors such as a biometric sensor, pedometer, accelerometer, and the like. If more than one sensor exists in an item, a parent sensor can be designated.

In one embodiment, the user has setup a profile with the merchant and/or the manufacturer of the lifestyle activity items that includes a wireless device identifier. Once lifestyle activity items have been purchased by the user, the merchant or third party such as the manufacturer notifies the user's wireless carrier of the purchase via a lifestyle activity item updater 130. In one example, the notifying party uses the wireless device identifier to determine the wireless carrier. In another example, the user enters information such as wireless carrier, wireless device number, wireless device identifier, or the like at checkout. For example, a user does not have to have a user profile with the merchant. If a user does not want to give personal information such as the user's wireless device number, the user can be pre-assigned a wireless identifier by the wireless device carrier. The notifying party can then send this wireless device identifier to the carrier for identifying the user.

The notification sent to the wireless carrier by the notifying party via its lifestyle activity item updater 230 can include a user identifier such as the wireless device identifier, a list of lifestyle activity items purchased, configuration parameters, and the like. The lifestyle activity items can be pre-associated with a lifestyle activity by the merchant and/or the manufacture. A user can also associate the lifestyle activity items with a lifestyle activity at checkout time. For example, a shirt, sun glasses, and shoes can be associated with running. Configuration parameters can be associated with sensors within the items or the items themselves. For example, if a pair of shoes includes a sensor such as a pedometer, the configuration parameters can be stride length, stride count, and the like.

The sunglasses can have a parameter associated with it that indicates that they are to be worn only when the weather is sunny. The lifestyle management environment 120 then uses this information to track for the sunglasses only when the weather is sunny. For example, as discussed in the co-pending and commonly owned application entitled "Active Lifestyle Management", the management environment 120 monitors for items associated with an activity. Various contexts can be associated with an activity such as a weather context. The activity can include various weather activities such as a "sunny" context and a "cloudy" context. Different items are monitored for the different contexts. For example, the sunglasses are only monitored for when the management environment 120 determines that the weather is sunny. If this information is pre-associated with the sunglasses at the time of purchases the lifestyle management environment 120 can be dynamically updated automatically. It should be noted that the user can also pre-assign configuration parameters to lifestyle activity items at the time of purchase.

The central server 106 receives the notification including the user (subscriber) identifier, a list of lifestyle activity items purchased, configuration parameters, and the like. In one embodiment, the central server 106 includes a lifestyle activity item information monitor 232. The lifestyle activity item information monitor 232 detects the notification and in one example, generates an update package for the associated wireless device. The update package can include the necessary information to enable the lifestyle activity item manager 120 in the wireless device 104 to update its databases.

For example, the update package can include lifestyle activity item IDs, context information, configuration parameters, activity identifiers, and the like. The lifestyle activity item manager 120 uses this information to update activity profiles and lifestyle activity item/sensor profiles. An activity profile includes information associated with a lifestyle activity such as an activity ID, associated contexts, associated sensors, sensor parameters, and the like. Activity profiles are discussed in greater detail in the co-pending and commonly owned application entitled "Active Lifestyle Management". Lifestyle activity item/sensor profiles, in one embodiment, include information associated with each lifestyle item and/or sensor. For example, a lifestyle activity item profile can include the activities associated with a lifestyle activity item. A lifestyle activity sensor profile can include configuration parameters for the respective sensor and the activities associated with the sensor. In an alternative embodiment, the central server 106 determines the wireless device associated with the notification and forwards the notification from the merchant 222 to the wireless device 104. The wireless device 104 then uses the information within the notification to perform the appropriate updates.

The following is an example of the above process. A user via the wireless device 104 purchases running shoes from a website. The running shoes are lifestyle activity compatible and include an RFID tag and one or more sensors. The manufacturer has pre-assigned the running shoes to a "running" lifestyle activity and has set a stride length for a sensor to 3 feet. The user via the Merchant's website changes the stride length to 2.5 feet. Once the running shoes have been purchased, the Merchant 222 sends a notification package to the user's wireless carrier. The notification package includes a user/subscriber identifier, item ID, activity information, sensor configuration (including the new parameters set by the user), and the like. The lifestyle activity item information manager 232 generates an update package and transmits the update package to the wireless device 104.

Another example is a heart rate monitor pre-configured by a manufacture. For example, a manufacture can preset a target heart zone rate. The user can then customize the upper and lower limits of the target heart rate zone based on the user's personal resting heart rate. If a user performs updates these parameters via a website while purchasing the heart rate monitor or an RFID enabled item including the monitor, the Merchant 222 sends a notification package to the user's wireless carrier as discussed above.

The lifestyle activity item manager 120 detects the update package and analyzes it. The activity item manager 120 adds information associated with the shows to a lifestyle activity item database and creates a profile for the item. The profile can include item information such as associated activities and sensor information. Sensor information can include any sensors associated with the shoes and the sensor's configuration parameters. If a "running" activity already exists, the "running" activity can be updated to include the shoes. Alternatively, the user can be prompted to decide whether or not to add the shoes to the activity. If a "running" activity does not already exist, the lifestyle activity management environment can automatically create a running activity for the user and associated with the shoes. The user can then be prompted to add additional information such as time and location contexts to be associated with the "running" activity. As can be seen, the present invention provides a dynamic environment for managing purchased lifestyle activity items.

In an alternate embodiment, after a user purchases a lifestyle activity item, the merchant 222 sends an email to the wireless device that includes a web link. The user can open the link to retrieve lifestyle activity item update information to perform the above lifestyle activity item update process. The wireless device 104 can also include a stand-alone application that interacts with the merchant's website to directly retrieve update information. In this example, the update information is retrieved directly from the merchant 222 and information is not received from the central server 106.

As discussed above, the user can purchase lifestyle activity items using a desktop or notebook computer. In this example, once lifestyle activity items are purchased the Merchant 222 can send a notification to the wireless carrier as discussed above. Alternatively, the information processing system 226 can include an application that directly retrieves the lifestyle activity item update information from the Merchant 222. The Merchant 222 can also send an email to the user that is retrieved on the information processing system. This email can include a link that a user can open to retrieve the lifestyle activity item update information. In these two examples, the wireless device 104 can communicate with the information processing system 226 to sync lifestyle activity item update information. For example, in one embodiment, the information processing system 226 can include a lifestyle activity item updater 234 that creates an update package similar to the update package discussed above with respect to the central server 106. The wireless device 104 receives the update package and performs the lifestyle activity item update process accordingly.

A user can also go into the merchant 222 and purchase a lifestyle activity item. In this example, the merchant can directly communicate lifestyle activity item information to the wireless device while the user is in the store. For example, after a user purchases a pair of running shoes, activity information associated with the shoes, the item ID, sensor information and configuration parameters, and the like can be communicated to the wireless device 104 directly. This information can be communicated to the wireless device using a near-field communication protocol such as Bluetooth, Zigbee, and the like. The lifestyle activity item manager 120 on the wireless device 104 can then perform the lifestyle activity item update process accordingly.

In another embodiment, an RFID tag on an active lifestyle product can include associated activity information, sensor information, and the like. The sensor information can be sensor name, IP address, configuration parameters, and the like. Upon purchasing the active lifestyle item, the user can read the item at the wireless device 104 and the RFID reader 348 at the wireless device 104 can pass the information to the lifestyle activity item manager 120. The lifestyle activity item manager 120 can then make the appropriate updates. In other words, an RFID tag within an active lifestyle item can send more than just an ID to a wireless device 104 which is used to cross reference the activity, item, and sensor profiles 350, 352, 354. The RFID tag can include memory comprising the required information for the lifestyle activity management environment 118 to perform its managing functions.

As can be seen from the above discussion the present invention provides an advantageous system for dynamically updating a lifestyle activity management environment on a wireless device when a user purchases new lifestyle activity items. The lifestyle activity management environment is automatically updated once a user purchases a lifestyle activity item. The user does not have to manually keep track of newly purchased items, their associated activities, associated sensor information and configuration parameters, and the like. Another advantage of the present invention is that a user can associate a lifestyle activity item with a lifestyle activity or re-configure sensors and parameters associated with sensors included with the item at the time of purchase.

Wireless Communication Device

Figure 3:
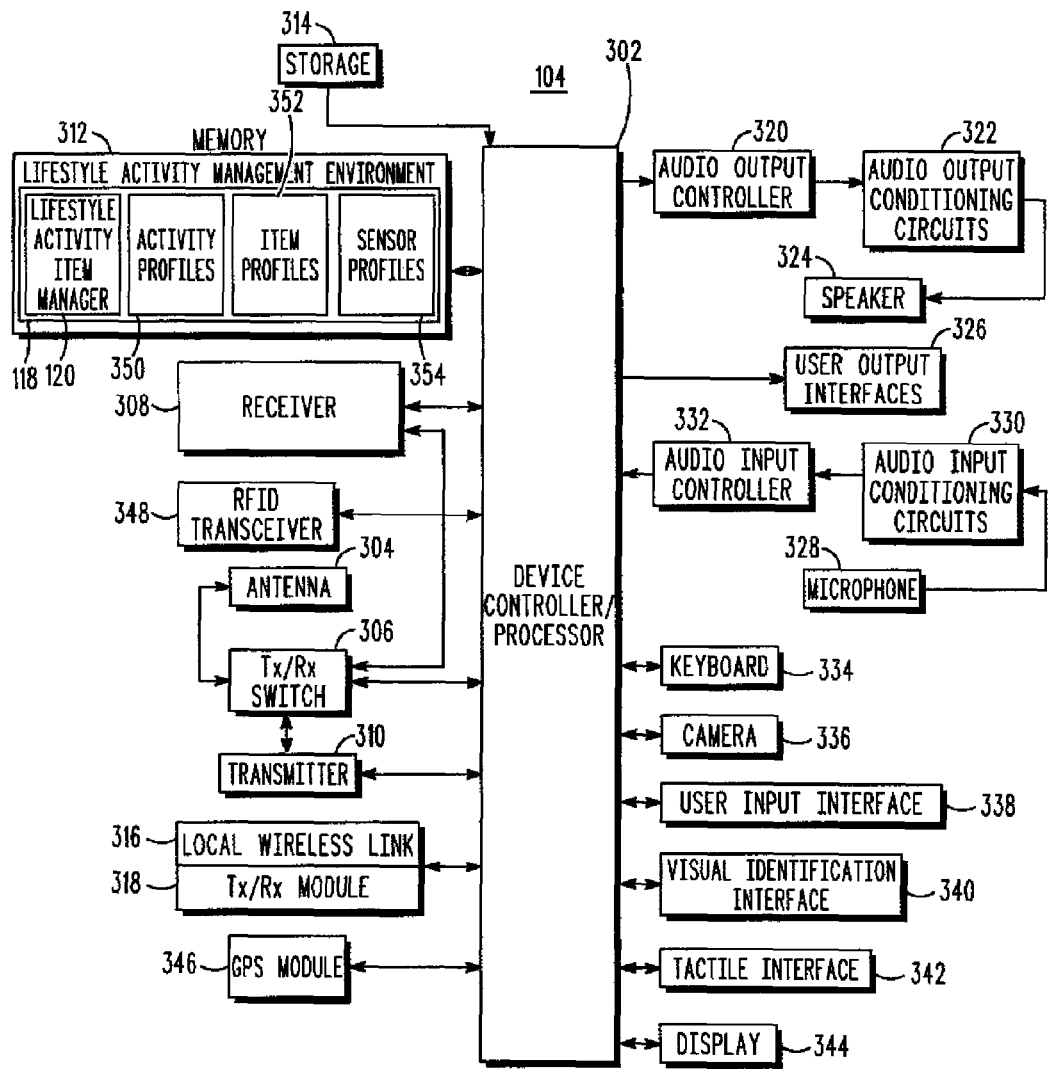
FIG. 3 is a block diagram illustrating a wireless communication device according to an embodiment of the present invention.

FIG. 3 is a block diagram illustrating a detailed view of the wireless device 104 according to an embodiment of the present invention. The wireless device 104 operates under the control of a device controller/processor 302, that controls the sending and receiving of wireless communication signals. In receive mode, the device controller 302 electrically couples an antenna 304 through a transmit/receive switch 306 to a receiver 308. The receiver 308 decodes the received signals and provides those decoded signals to the device controller 302.

In transmit mode, the device controller 302 electrically couples the antenna 304, through the transmit/receive switch 306, to a transmitter 310. The device controller 302 operates the transmitter and receiver according to instructions stored in the memory 312. These instructions include, for example, a neighbor cell measurement-scheduling algorithm. The memory 312, in one embodiment, also includes the lifestyle activity management environment 118. As discussed above, the lifestyle management environment 118 includes the lifestyle activity item manager 120, which has been discussed in greater detail above.

The memory 312, in one embodiment, also includes lifestyle activity profiles 350, lifestyle activity item profiles 352, and sensor profiles 354. The lifestyle activity profiles 350 are discussed in greater detail in the co-pending and commonly owned application entitled "Active Lifestyle Management". The lifestyle activity item profiles 352 include information such as activity(s) associated with the item, sensors associated with the items, and the like. The sensor profiles 354 include information such as sensor configuration parameters, context information such as time, location, weather, and the like, activities associated with the sensor, RFID data, and the like. One example of sensor parameters is sampling rate, target values, and the like. Sensor configuration information can include sensor name, sensor communication address, and the like.

The wireless device 104, in one embodiment, also includes an RFID transceiver 348 for communicating with RFID enabled items 120. In another embodiment, the receiver 308 is capable of receiving RFID signals. The wireless device 104, also includes non-volatile storage memory 314 for storing, for example, an application waiting to be executed (not shown) on the wireless device 104. The wireless device 104, in this example, also includes an optional local wireless link 316 that allows the wireless device 104 to directly communicate with another wireless device without using a wireless network (not shown).

The optional local wireless link 316, for example, is provided by Bluetooth, Zigbee, Infrared Data Access (IrDA) technologies, or the like. The optional local wireless link 316 also includes a local wireless link transmit/receive module 318 that allows the wireless device 104 to directly communicate with another wireless device such as wireless devices communicatively coupled to personal computers, workstations, and the like.

The wireless device 104 of FIG. 3 further includes an audio output controller 320 that receives decoded audio output signals from the receiver 308 or the local wireless link transmit/receive module 318. The audio controller 320 sends the received decoded audio signals to the audio output conditioning circuits 322 that perform various conditioning functions. For example, the audio output conditioning circuits 322 may reduce noise or amplify the signal. A speaker 324 receives the conditioned audio signals and allows audio output for listening by a user. The audio output controller 320, audio output conditioning circuits 322, and the speaker 324 also allow for an audible alert to be generated notifying the user of a missed call, received messages, or the like. The wireless device 104 further includes additional user output interfaces 326, for example, a head phone jack (not shown) or a hands-free speaker (not shown).

The wireless device 104 also includes a microphone 328 for allowing a user to input audio signals into the wireless device 104. Sound waves are received by the microphone 328 and are converted into an electrical audio signal. Audio input conditioning circuits 330 receive the audio signal and perform various conditioning functions on the audio signal, for example, noise reduction. An audio input controller 332 receives the conditioned audio signal and sends a representation of the audio signal to the device controller 302.

The wireless device 104 also comprises a keyboard 334 for allowing a user to enter information into the wireless device 104. The wireless device 104 further comprises a camera 336 for allowing a user to capture still images or video images into memory 312. Furthermore, the wireless device 104 includes additional user input interfaces 338, for example, touch screen technology (not shown), a joystick (not shown), or a scroll wheel (not shown). In one embodiment, a peripheral interface (not shown) is also included for allowing the connection of a data cable to the wireless device 104. In one embodiment of the present invention, the connection of a data cable allows the wireless device 104 to be connected to a computer or a printer.

A visual notification (or indication) interface 340 is also included on the wireless device 104 for rendering a visual notification (or visual indication), for example, a sequence of colored lights on the display 344 or flashing one or more LEDs (not shown), to the user of the wireless device 104. For example, a received multimedia message may include a sequence of colored lights to be displayed to the user as part of the message. Alternatively, the visual notification interface 340 can be used as an alert by displaying a sequence of colored lights or a single flashing light on the display 344 or LEDs (not shown) when the wireless device 104 receives a message, or the user missed a call.

The wireless device 104 also includes a tactile interface 342 for delivering a vibrating media component, tactile alert, or the like. For example, a multimedia message received by the wireless device 104, may include a video media component that provides a vibration during playback of the multimedia message. The tactile interface 342, in one embodiment, is used during a silent mode of the wireless device 104 to alert the user of an incoming call or message, missed call, or the like. The tactile interface 342 allows this vibration to occur, for example, through a vibrating motor or the like.

The wireless device 104 also includes a display 340 for displaying information to the user of the wireless device 104 and an optional Global Positioning System (GPS) module 346. The optional GPS module 346 determines the location and/or velocity information of the wireless device 104. This module 346 uses the GPS satellite system to determine the location and/or velocity of the wireless device 104. Alternative to the GPS module 346, the wireless device 104 may include alternative modules for determining the location and/or velocity of wireless device 104, for example, using cell tower triangulation and assisted GPS.

Exemplary Information Processing System

Figure 4:
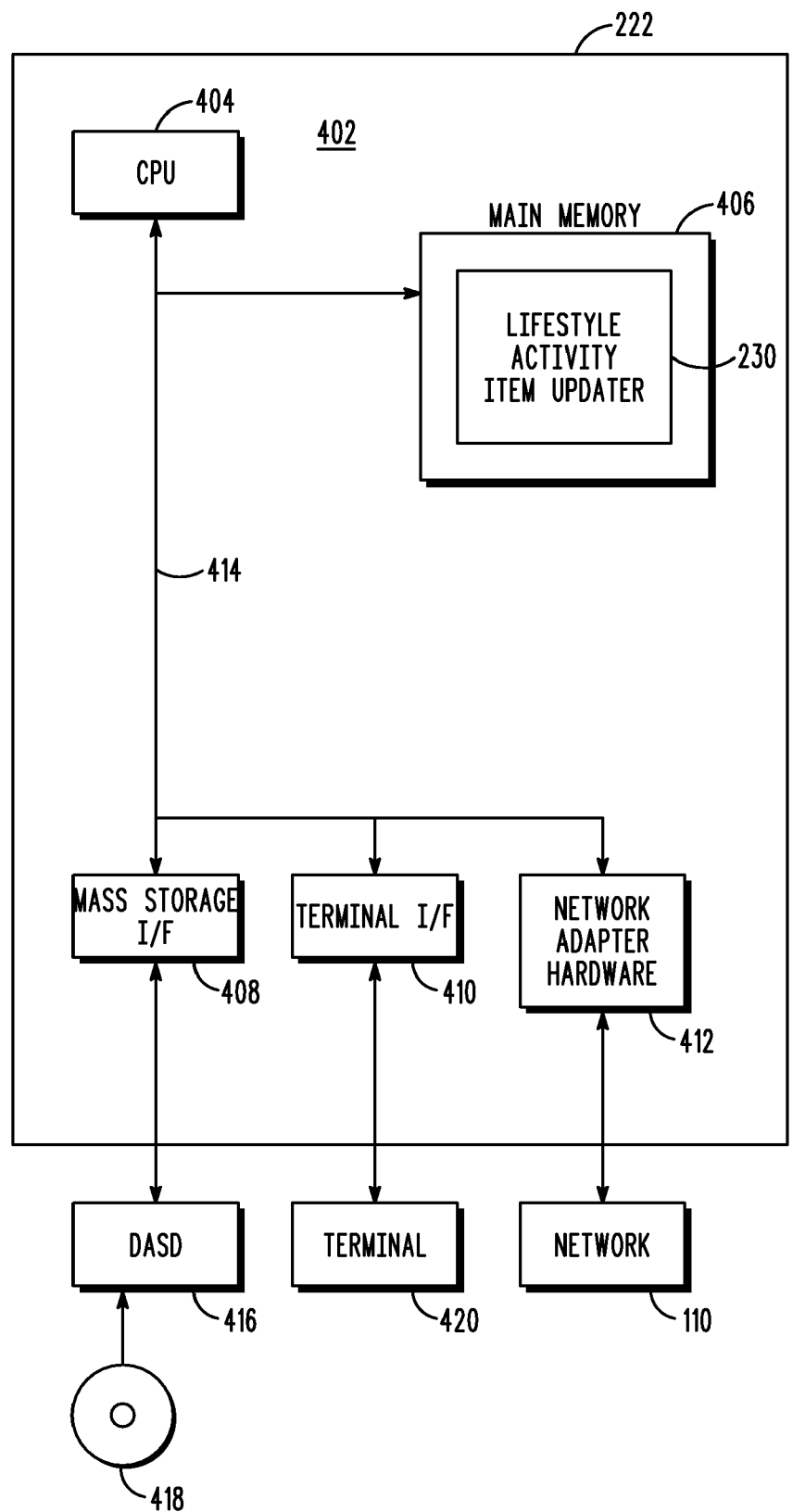
FIG. 4 is a block diagram illustrating a information processing system according to an embodiment of the present invention.

FIG. 4 is a block diagram illustrating a detailed view of an information processing system such as the Merchant information processing system 222. The merchant information processing system 222, in one embodiment, is based upon a suitably configured processing system adapted to implement the exemplary embodiment of the present invention. Any suitably configured processing system is similarly able to be used as the merchant information processing system 222 by embodiments of the present invention, for example, a personal computer, workstation, or the like.

The merchant information processing system 222 includes a computer 402. The computer 402 has a processor 404 that is communicatively connected to a main memory 406 (e.g., volatile memory), non-volatile storage interface 408, a terminal interface 410, and a network adapter hardware 412. A system bus 414 interconnects these system components. The non-volatile storage interface 408 is used to connect mass storage devices, such as data storage device 416 to the merchant information processing system 222. One specific type of data storage device is a computer readable medium such as a CD drive, which may be used to store data to and read data from a CD 418 or DVD or floppy diskette (not shown). Another type of data storage device is a data storage device configured to support, for example, NTFS type file system operations.

The main memory 406, in one embodiment, includes a lifestyle activity item updater as discussed above. Although shown as residing in the memory 606, these components can be implemented in hardware within the merchant information processing system 222. In one embodiment, the merchant information processing system 222 utilizes conventional virtual addressing mechanisms to allow programs to behave as if they have access to a large, single storage entity, referred to herein as a computer system memory, instead of access to multiple, smaller storage entities such as the main memory 406 and data storage device 416. Note that the term "computer system memory" is used herein to generically refer to the entire virtual memory of the merchant information processing system 222.

Although only one CPU 404 is illustrated for computer 402, computer systems with multiple CPUs can be used equally effectively. Embodiments of the present invention further incorporate interfaces that each includes separate, fully programmed microprocessors that are used to off-load processing from the CPU 404. Terminal interface 410 is used to directly connect one or more terminals 420 to computer 402 to provide a user interface to the computer 402. These terminals 620, which are able to be non-intelligent or fully programmable workstations, are used to allow system administrators and users to communicate with the thin client. The terminal 420 is also able to consist of user interface and peripheral devices that are connected to computer 402 and controlled by terminal interface hardware included in the terminal I/F 410 that includes video adapters and interfaces for keyboards, pointing devices, and the like.

An operating system, according to an embodiment, can be included in the main memory 406 and is a suitable multitasking operating system such as the Linux, UNIX, Windows XP, and Windows Server operating system. Embodiments of the present invention are able to use any other suitable operating system, or kernel, or other suitable control software. Some embodiments of the present invention utilize architectures, such as an object oriented framework mechanism, that allows instructions of the components of operating system (not shown) to be executed on any processor located within the client. The network adapter hardware 412 is used to provide an interface to the WAN 110 or any other network. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk (not shown), CD ROM 418, or other form of recordable media, or via any type of electronic transmission mechanism.

Process of Dynamically Managing Lifestyle Activity Items

Figure 5:
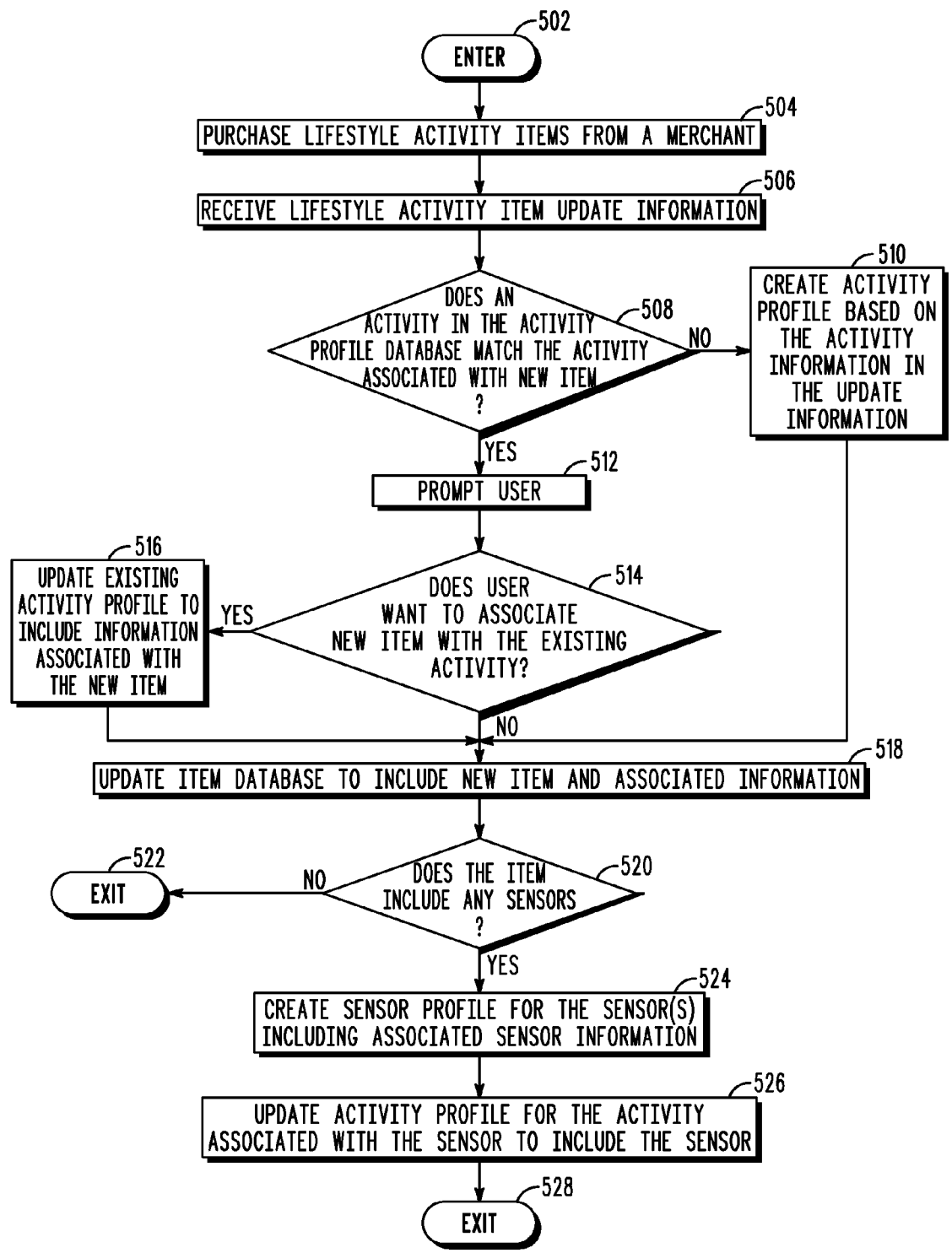
FIG. 5 is an operational flow diagram illustrating a process of automatically updating lifestyle activity item information on a wireless device.

FIG. 5 is an operational flow diagram illustrating a process of dynamically updating lifestyle activity item information on a wireless device 104. The operational flow diagram of FIG. 5 begins at step 502 and flows directly to step 504. A user, at step 504, purchases one or more lifestyle activity items form a merchant. As discussed above, the user can use a wireless device 104 or information processing system 226 to purchase the items, or can personally purchase the items at a store. The lifestyle activity item manager 120 receives item update information from the merchant. For example, the merchant can send an update package to the wireless carrier, which then forwards the information to the wireless device 104. If the user personally purchases the items at a store, the merchant can directly communicate with the wireless device 104 via a short range communication protocol such as Bluetooth, Zigbee, Near Field Communication ("NFC"), or the like. The wireless device 104 can also download the information from the Internet.

The lifestyle activity item manager 120, at step 508, analyzes the update information and determines if an activity profile 350 in an activity profile database matches the activity associated with the new item. If the result of this determination is negative, the lifestyle activity item manager 120, at step 510, creates an activity profile based on the activity information included in the update information received from the merchant. The control then flows to step 518. If the result of this determination is positive, the lifestyle activity item manager 120, at step 512, prompts the user and at step 514, the lifestyle activity item manager 120 determines if the user wants to associate the new item with the existing activity.

If the result of this determination is positive, the lifestyle activity item manager 120, at step 516, updates the existing activity profile 350 to include information associated with the new item. The control flows to step 518. If the result of this determination is negative, the lifestyle activity item manager 120, at step 518, updates an item database to include an item profile 352 for the new item comprising information associated with the new item.

The lifestyle activity item manager 120, at step 520, determines of the new item includes any sensors. If the result of this determination is negative, the control flow exits at step 522. If the result of this determination is positive, the lifestyle activity item manager 120, at step 524, creates a sensor profile for each sensor associated with the new item. The sensor profile includes information such as sensor ID, sensor configuration parameters, associated activity information, and the like. The lifestyle activity item manager 120, at step 526, the activity profile 350 for the activity associated with the new item to include sensor information. The control flow exits at step 528.

Figure 6:
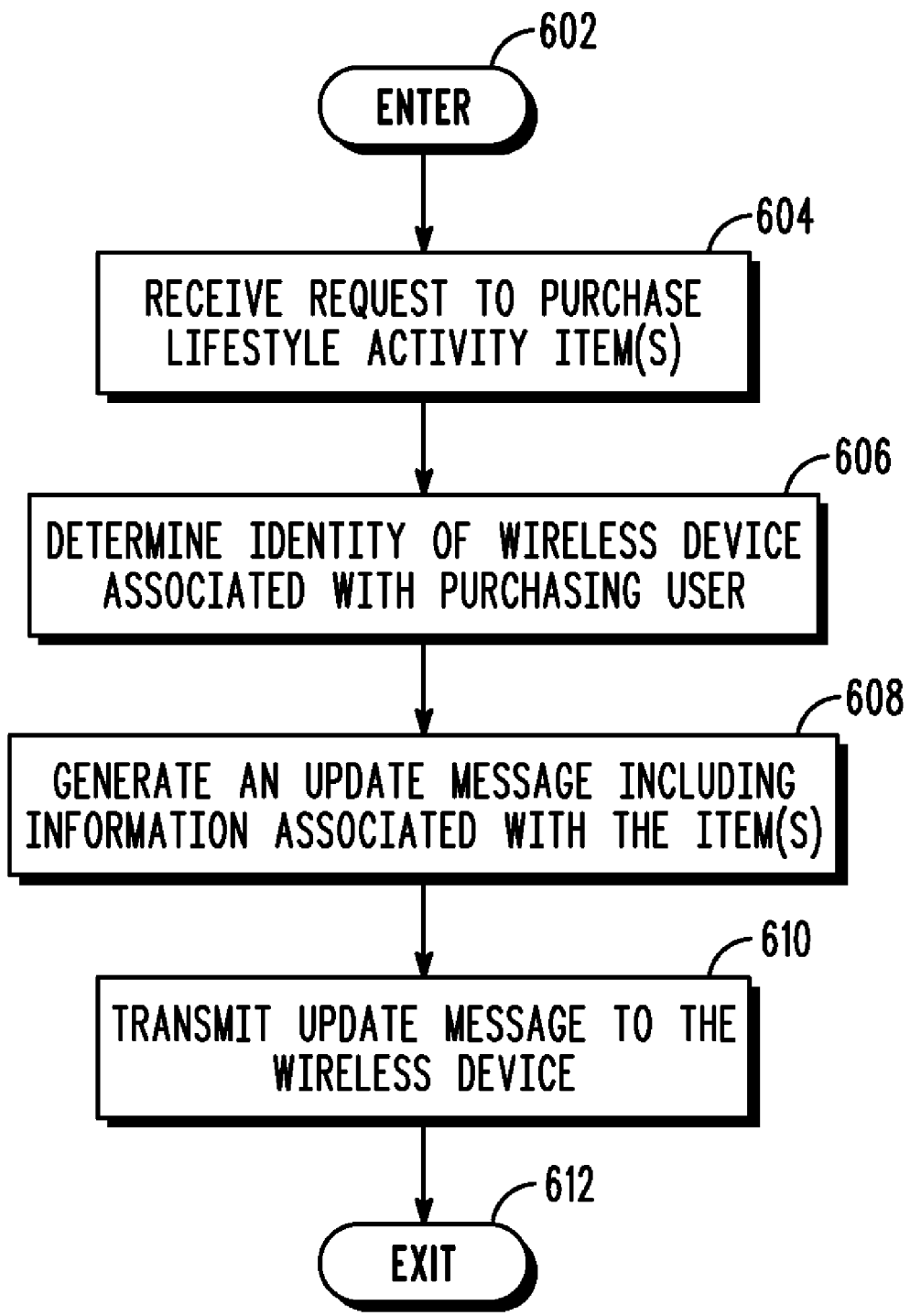
FIGS. 6 and 7 are two operational flow diagrams illustrating two examples of a process of a merchant dynamically transmitting lifestyle activity item information to a wireless device.

Process of Transmitting Lifestyle Activity Item Update Information to a Wireless Device FIG. 6 is an operational flow diagram illustrating a process of transmitting lifestyle activity item update information to a wireless device. The operational flow diagram of FIG. 6 begins at step 602 and flows directly to step 604. A merchant, at step 604, receives a request to purchase one or more lifestyle activity items. For example, a user can send the request via the wireless device 104 or information processing system 226. The user can also personally purchase the items at the store.

The lifestyle activity item updater 130, at step 606, analyzes the request and determines the identity of the wireless device associated with the purchasing user. The lifestyle activity item updater 130 can also determine an identifier associated with the lifestyle activity items purchased. The lifestyle activity item updater 130, at step 608, generates an update message that includes information associated with the purchased lifestyle activity items. For example, the update message can include item identifiers, activity information, sensor information and configuration parameters, and the like. The merchant, at step 610, transmits the update message to the wireless device 104. In one embodiment, the merchant transmits the update message to a wireless carrier, which then forwards the update message to the wireless device 104. In another embodiment, the merchant transmits the message directly to the wireless device 104 via, NFC, Bluetooth, Zigbee, or the like. The control flow then exits at step 612.

Figure 7:
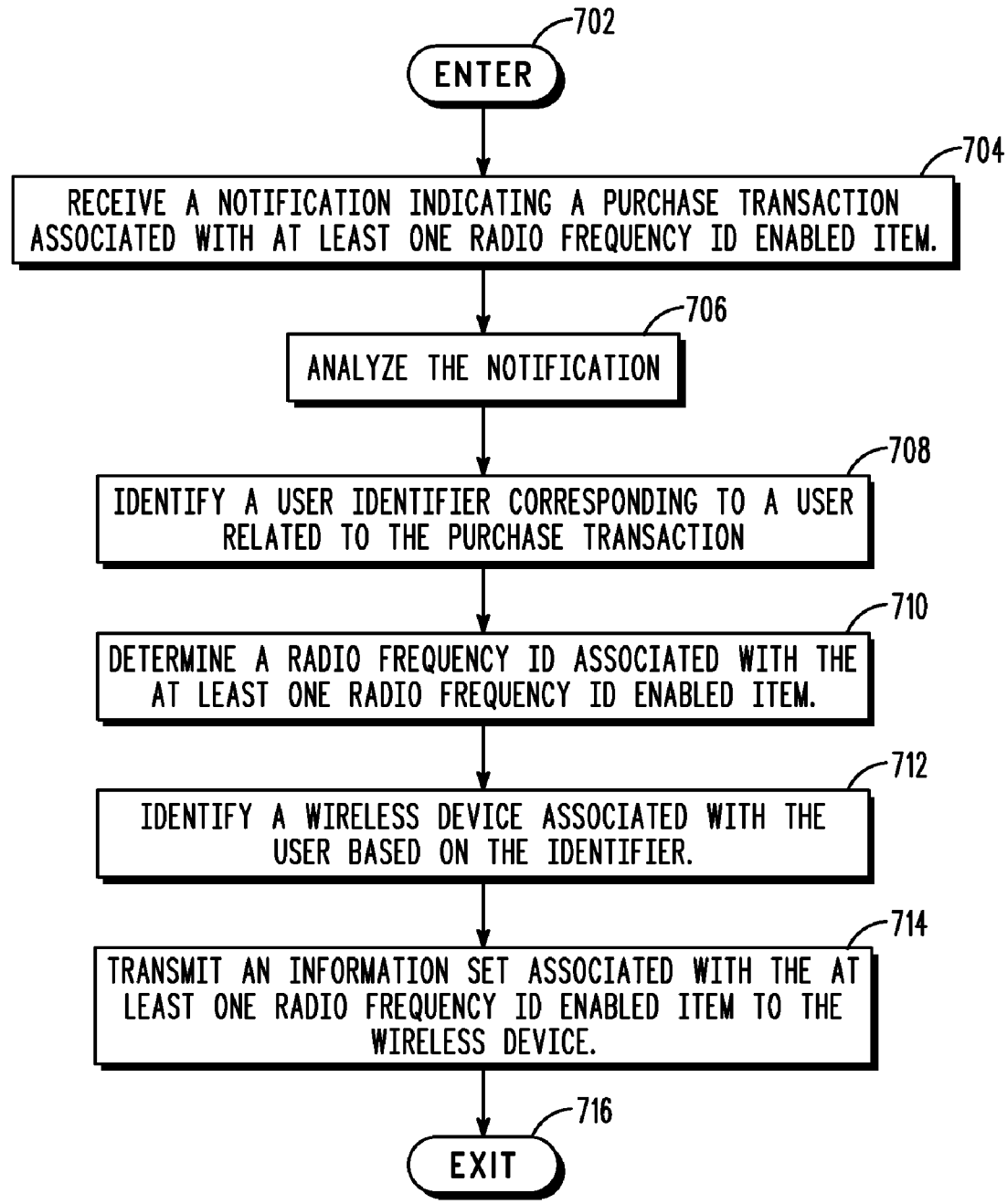

Process of Transmitting Lifestyle Activity Item Update Information to a Wireless Device FIG. 7 is an operational flow diagram illustrating another process of transmitting lifestyle activity item update information to a wireless device. It should be noted that although FIG. 7 is directed towards the central server 106, the following discussion is also applicable to any information processing system communicatively coupled to the wireless communications system 100. The central server 106 is only used as one example. The operational flow diagram of FIG. 7 begins at step 702 and flows directly to step 704. The method includes receiving a The information processing system 106, at step 704, receives a notification indicating a purchase transaction associated with at least one radio frequency ID enabled item. The information processing system 106, at step 706, analyzes the notification and in response to the analyzing, a user identifier corresponding to a user related to the purchase transaction is determined at step 708. The information processing system 106, at step 710, also determines a radio frequency ID associated with the at least one radio frequency ID enabled item. The information processing system 106, at step 712, identifies a wireless device associated with the user based on the user identifier. The information processing system 106, at step 714, transmits an information set associated with the at least one radio frequency ID enabled item to the wireless device. The information set includes at least the radio frequency ID associated with the at least one radio frequency ID enabled item. The control flow exits at step 716.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for managing information associated with purchases of active lifestyle products by at least one user, the method with a lifestyle activity information monitoring server, communicatively coupled to a wireless communications system of at least one wireless carrier associated with the at least one user, the method comprising:
    receiving, with a lifestyle activity information monitoring server, a notification, from an information processing system, indicating a purchase transaction associated with at least one radio frequency ID enabled item, wherein receiving the notification is independent of reading an RFID tag;
    analyzing, with the lifestyle activity information monitoring server, the notification;
    determining, with the lifestyle activity information monitoring server, in response to the analyzing,
        a user identifier corresponding to a user related to the purchase transaction, and
        a radio frequency ID associated with the at least one radio frequency ID enabled item;
    identifying, with the lifestyle activity information monitoring server, based on the user identifier, a wireless device associated with the user; and
    transmitting, with the lifestyle activity information monitoring server, to the wireless device via the wireless communication system of the at least one wireless carrier an information set associated with the at least one radio frequency ID enabled item, wherein the information set includes at least the radio frequency ID associated with the at least one radio frequency ID enabled item, wherein the information processing system is separate and distinct from the lifestyle activity information monitoring server and the wireless device.

2. The method of claim 1, wherein the the information processing system is communicatively coupled to point-of-purchase for the at least one radio frequency ID enabled item.

3. The method of claim 1, wherein the information set further comprises at least one of:
    information associated with at least one sensor included in the radio frequency ID enabled item, wherein the at least one sensor generates data associated with at least one activity being performed by the user while using the radio frequency ID enabled item;
    configuration information associated with the at least one sensor; and
    activity information associated with the radio frequency ID enabled item.

4. A method for managing information associated with active lifestyle products, the method with a wireless communication device associated with a user of the active lifestyle products, comprising:
    receiving, via a wireless communication carrier, an information set associated with at least one radio frequency ID enabled item purchased for use by a user of the wireless communication device, the information set comprising at least a radio frequency ID associated with the at least one radio frequency ID enabled item and operational configuration information associated with using the at least one radio frequency ID enabled item, wherein the information set is received from one of a merchant, a manufacturer of the at least one radio frequency ID enabled item, and the at least one radio frequency ID enabled item; and
    updating, with the wireless communication device, a first database for storing at least information associated with radio frequency ID enabled items to include at least the radio frequency ID associated with the at least one radio frequency ID enabled item purchased for use by the user.

5. The method of claim 4, further comprising:
    analyzing the information set;
    identifying, based at least in part on the analyzing, a user activity associated with the at least one radio frequency ID enabled item; and
    updating a second database to store an association of the user activity with at least the radio frequency ID that is associated with the at least one radio frequency ID enabled item.

6. The method of claim 4, further comprising:
    analyzing the information set;
    determining, in response to the analyzing, that the at least one radio frequency ID enabled item includes at least one sensor; and
    updating, in response to the determining, at least the first database to associate the at least one sensor with the radio frequency ID associated with the at least one radio frequency ID enabled item.

7. The method of claim 6, further comprising:
    determining, in response to the analyzing, that at least one user activity is associated with the at least one sensor; and
    updating, in response to the determining, at least a second database to store an association of the at least one sensor with the at least one user activity associated with the radio frequency ID corresponding to the at least one radio frequency ID enabled item.

8. The method of claim 7, further comprising:
automatically configuring the at least one sensor based on data in the information set; and
associating configuration data of the at least one sensor to the at least one user activity associated with the radio frequency ID corresponding to the at least one radio frequency ID enabled item.

9. The method of claim 4, further comprising:
configuring at least one parameter of the at least one RFID enabled item via a website of at least one of the merchant and the manufacturer of the at least one RFID enabled item, wherein the received information set includes the configured at least one parameter.

10. The method of claim 4, wherein the receiving further comprises:
receiving the information set directly from the merchant via a short range communication protocol.

11. The method of claim 4, wherein the receiving the information set is in response to a transaction associated with the at least one RFID enabled items at a merchant's website.

12. The method of claim 4, wherein the receiving the information set further includes:
receiving the information set from one of the merchant and the manufacturer via an information processing system communicatively coupled to a wireless communications system to which the wireless device is subscribed to.

13. The method of claim 4, wherein the receiving the information set further includes:
receiving a web link from one of the merchant and the manufacturer, wherein the web link includes a web address associated with an information processing system including the information set; and
transmitting, in response to receiving the web link, a retrieval request to the information processing system for retrieving the information set.

14. The method of claim 4, wherein the receiving the information set further includes:
directly receiving the information set from the merchant via a near field communications protocol.

15. The method of claim 14, wherein the short range communication protocol comprises at least one of:
Bluetooth;
Near Field Communication; and
Zigbee.

16. A wireless communication device associated with a user of active lifestyle products, the wireless communication device comprising:
a memory;
a processor communicatively coupled to the memory;
a lifestyle activity management module communicatively coupled to the memory and the processor, the lifestyle activity management module for:
receiving, via a wireless communication carrier, an information set associated with at least one radio frequency ID enabled item purchased for use by a user of the wireless communication device, the information set comprising at least a radio frequency ID associated with the at least one radio frequency ID enabled item, an indication that the at least one radio frequency ID enabled item includes at least one sensor, and operational configuration information associated with using the at least one radio frequency ID enabled item, wherein the information set is received from one of a merchant, a manufacturer of the at least one radio frequency ID enabled item, and the at least one radio frequency ID enabled item; and
updating, with the wireless communication device, a first database for storing at least information associated with radio frequency ID enabled items to include at least the radio frequency ID associated with the at least one radio frequency ID enabled item purchased for use by the user.

17. The wireless communication device of claim 16, wherein the lifestyle activity management module is further for:
analyzing the information set;
identifying, based at least in part on the analyzing, a user activity associated with the at least one radio frequency ID enabled item; and
updating a second database to store an association of the user activity with at least the radio frequency ID that is associated with the at least one radio frequency ID enabled item.

18. The wireless communication device of claim 16, wherein the lifestyle activity management module is further for:
analyzing the information set;
determining, in response to the analyzing, that the at least one radio frequency ID enabled item includes the at least one sensor; and
updating, in response to the determining, at least the first database to associate the at least one sensor with the radio frequency ID associated with the at least one radio frequency ID enabled item.

19. The wireless communication device of claim 18, wherein the lifestyle activity management module is further for:
determining, in response to the analyzing, that at least one user activity is associated with the at least one sensor;
updating, in response to the determining, at least a second database to store an association of the at least one sensor with the at least one user activity associated with the radio frequency ID corresponding to the at least one radio frequency ID enabled item
automatically configuring the at least one sensor based on data in the information set; and
associating configuration data of the at least one sensor to the at least one user activity associated with the radio frequency ID corresponding to the at least one radio frequency ID enabled item.

20. The wireless communication device of claim 16, wherein the lifestyle activity management module is further for:
configuring at least one parameter of the at least one RFID enabled item via a website of at least one of the merchant and the manufacturer of the at least one RFID enabled item, wherein the received information set includes the configured at least one parameter.

* * * * *